United States Patent
Kim et al.

(10) Patent No.: US 8,314,720 B2
(45) Date of Patent: Nov. 20, 2012

(54) TERMINAL AND METHOD FOR EXECUTING FUNCTION USING HUMAN BODY COMMUNICATION

(75) Inventors: Hyung Tae Kim, Seoul (KR); Hee Chan Choi, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 367 days.

(21) Appl. No.: 12/782,317

(22) Filed: May 18, 2010

(65) Prior Publication Data

US 2010/0289673 A1 Nov. 18, 2010

(30) Foreign Application Priority Data

May 18, 2009 (KR) .................. 10-2009-0043070

(51) Int. Cl.
*H03M 11/00* (2006.01)

(52) U.S. Cl. ................ 341/20; 341/26; 341/30; 341/33; 341/34; 345/173; 345/174

(58) Field of Classification Search ............ 341/20, 341/26, 33, 34; 345/173, 174
See application file for complete search history.

(56) References Cited

U.S. PATENT DOCUMENTS

| | | | | |
|---|---|---|---|---|
| 4,550,310 A * | 10/1985 | Yamaguchi et al. | ............ | 307/99 |
| 5,880,718 A * | 3/1999 | Frindle et al. | .................. | 345/174 |
| 6,545,614 B1 * | 4/2003 | Kasai | ............................. | 341/33 |
| 6,777,922 B2 * | 8/2004 | Tajima et al. | .............. | 324/76.75 |
| 7,292,230 B2 * | 11/2007 | Tokkonen | ...................... | 345/173 |
| 7,535,459 B2 * | 5/2009 | You et al. | ....................... | 345/169 |
| 7,812,825 B2 * | 10/2010 | Sinclair et al. | ................. | 345/173 |
| 2009/0207138 A1 * | 8/2009 | Thorn | ............................. | 345/173 |
| 2010/0124946 A1 * | 5/2010 | Chun | ............................ | 455/566 |
| 2010/0134422 A1 * | 6/2010 | Borras | .......................... | 345/173 |
| 2010/0259503 A1 * | 10/2010 | Yanase et al. | ................. | 345/174 |
| 2011/0157069 A1 * | 6/2011 | Zhuang et al. | ................. | 345/174 |
| 2012/0032908 A1 * | 2/2012 | Joo et al. | ........................ | 345/173 |

* cited by examiner

*Primary Examiner* — Linh Nguyen
(74) *Attorney, Agent, or Firm* — The Farrell Law Firm, P.C.

(57) ABSTRACT

Provided is a method and a terminal for executing a function of a terminal according to data transmitted and received through a human body, which includes detecting a touch in a human body communication signal input unit, wherein the human body communication signal input unit is in a human body communication key mode; determining a number detected touches and determining a number pulse signals transmitted during a time in which the touch is maintained when the touch is detected; and executing a function corresponding to the human body communication signal.

5 Claims, 7 Drawing Sheets

TERMINAL AND METHOD FOR EXECUTING FUNCTION USING HUMAN BODY COMMUNICATION

PRIORITY

This application claims priority under 35 U.S.C. §119(a) to an application filed in the Korean Intellectual Property Office on May 18, 2009, and assigned Serial No. 10-2009-0043070, the content of which is incorporated herein by reference.

BACKGROUND OF THE INVENTION

1. Field of the Invention

The present invention relates generally to a method and a terminal for executing a function using human body communication, and more particularly, to a terminal and method for recognizing a signal detected through human body communication as a signal input to execute a specific function, and executing the specific function.

2. Description of the Related Art

Communications may be largely classified into wired communications using wired media, such as a cable, and wireless communications using wireless media, such as communications performed over-the-air or through a vacuum. Recently, developments in human body communication using a human body as communication medium have been progressing in various countries such as Japan or Germany.

Human body communication is similar to communication methods such as wireless mobile communications (e.g., BLUETOOTH® wireless communications, ZIGBEE® wireless communications, etc.), but includes transmission and reception of data via direct contact with a human body without using Radio Frequency (RF) communications. A fundamental concept of the human body communication is described as follows with reference to FIG. 1.

Figure 1:
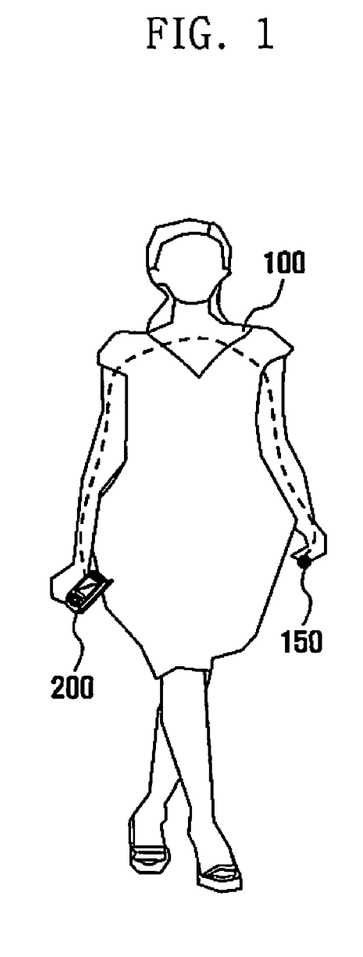
FIG. 1 is a view illustrating a concept executing human body communication.

FIG. 1 is a diagram illustrating an example of human body communication.

Referring to FIG. 1, a controlled terminal 150 and a control terminal 200 are mounted to contact with a human body 100. If a user inputs a given pressure or a command signal in the control terminal 200, the control terminal 200 transfers an input signal to the controlled terminal 150 through a human body 100. The controlled terminal 150 detects the signal transferred through the human body 100, and executes an operation corresponding to the detected signal.

As shown in FIG. 1, human body communication is comprised of a receiving end receiving a signal like the controlled terminal 150 and a transmitting end transmitting the signal like the control terminal 200. A human body 100 is located between the receiving end and the transmitting end, and performs a channeling function for transmitting and receiving the signal. Here, the human body 100 functions as a capacitor.

In recent years, transmission and reception data speeds for human body communication have gradually increased. Power consumption required to perform human body communication is significantly less than power consumption required for wireless communications, such as through Bluetooth. Therefore, there is a need for a method and apparatus for executing various functions in a terminal using human body communication.

SUMMARY OF THE INVENTION

The present invention has been made in view of the above problems, and provides a method and a terminal for executing a function using human body communication.

In accordance with an aspect of the present invention, a method for executing a function of a terminal according to data transmitted and received through a human body is provided. The method includes detecting a touch in a human body communication signal input unit, wherein the human body communication signal input unit is in a human body communication key mode; determining a number detected touches and determining a number pulse signals transmitted during a time in which the touch is maintained when the touch is detected; and executing a function corresponding to the human body communication signal.

In accordance with another aspect of the present invention, a terminal for executing a function is provided. The terminal includes a human body communication signal input unit for detecting a touch corresponding to a human body communication signal; a human body communication signal checking unit for determining a number of detected touches and a number of times pulse signals are transmitted during a time in which the touch is maintained, when the touch is detected; and a controller for executing a function corresponding to the checked human body communication signal.

BRIEF DESCRIPTION OF THE DRAWINGS

The objects, features and advantages of the present invention will be more apparent from the following detailed description in conjunction with the accompanying drawings, in which.

DETAILED DESCRIPTION OF EMBODIMENTS OF THE PRESENT INVENTION

Embodiments of the present invention are described with reference to the accompanying drawings in detail. The same or similar reference numbers are used throughout the drawings to refer to the same or like parts. Detailed descriptions of well-known functions and structures incorporated herein may be omitted to avoid obscuring the subject matter of the present invention.

As used herein, term "terminal" refers to a device that may generate and exchange data with an external device such as Portable Multimedia Player (PMP), a computer, or a notebook computer. Terminals according to embodiments of the present invention further include a device that can at least partially contact a user's body to transmit and receive an electric signal.

Figure 2:
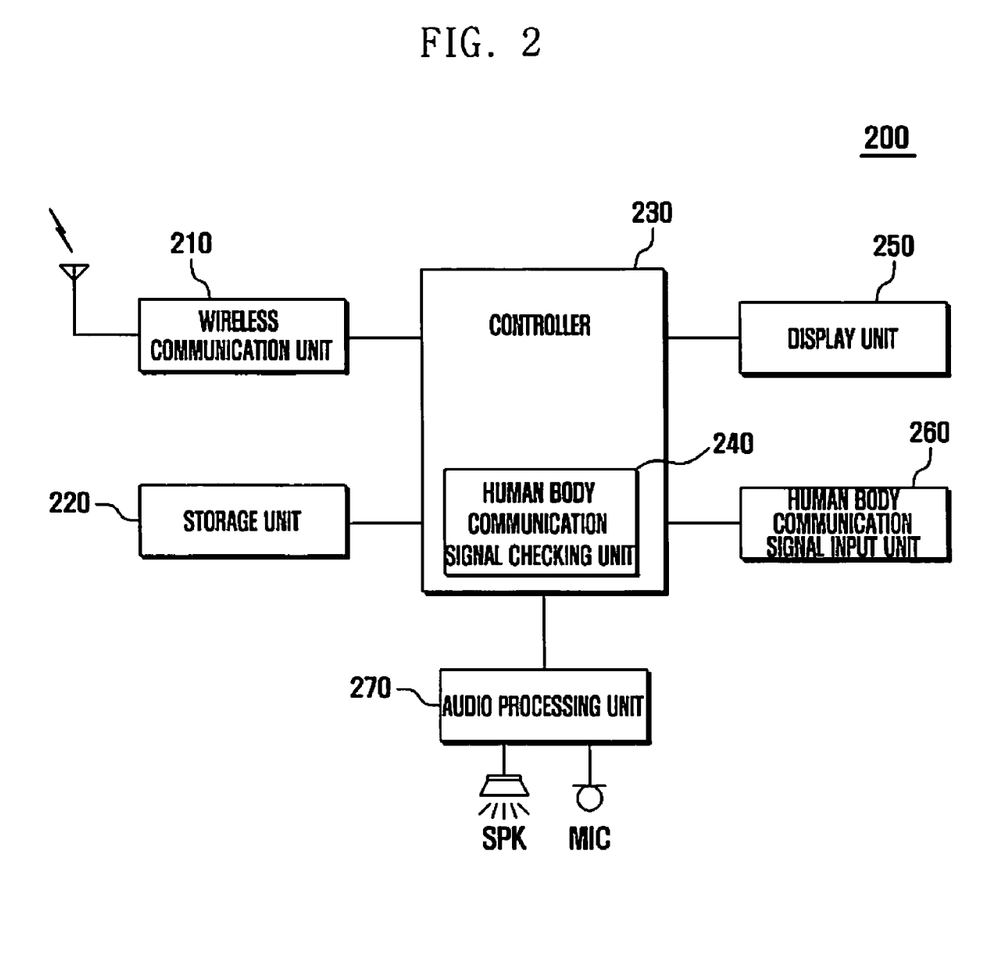
FIG. 2 is a block diagram illustrating a configuration of a terminal according to an embodiment of the present invention.

FIG. 2 is a block diagram illustrating a configuration of a terminal according to an embodiment of the present invention.

Referring to FIG. 2, a terminal 200 includes a wireless communication unit 210, a storage unit 220, a controller 230, a human body communication signal checking unit 240, a display unit 250, a human body communication signal input unit 260, and an audio processing unit 270. In the present example, the terminal 200 is a portable terminal. However, the present invention is not limited thereto, and the terminal 200 may be any one of various types of devices capable of executing human body communication, and transmitting and receiving data.

The wireless communication unit 210 executes a communication function between the terminal 200 and a base station. The wireless communication unit 210 includes an RF transmitter for up-converting the frequency of a signal to be transmitted and amplifying the signal, and an RF receiver low-noise for amplifying a received signal and down-converting the frequency of the amplified signal. The wireless communication unit 210 can also transmit and receive to and from an external terminal connected thereto by a wireless means.

The storage unit 220 stores application programs related to functions executed by the terminal 200 and various data generated upon execution of the functions. Signals input from a user through human body communication and tables mapped to various functions to be executed according to the signals input through the human body communication may be stored in the storage unit 220. For example, the signals input through human body communication may be mapped to functions to be executed according to Table 1.

TABLE 1

|  | Short once | Short twice | Short three times | Long once, Short twice | Long twice |
|---|---|---|---|---|---|
| Power on/off | 0 | | | | |
| Search telephone dictionary | | 0 | | | |
| Search message | | | 0 | | |
| Re-transmission | | | | 0 | |
| Execute DMB | | | | | 0 |

Executable functions mapped according to human body communication signals stored in the storage unit 220 may include any of various functions executed in the terminal 200, such as a camera function, an Internet function, and a calling function. The executable functions mapped according to human body communication signals may be directly set by a user, and/or may be optionally set at the time of manufacturing the terminal 200. Functions mapped according to the length of a human body communication signal and/or the number of times a human body communication signal has been provided as input can be stored according to a user's selection and/or a manufacturing company of the terminal 200.

The controller 230 performs a function controlling the overall operation and states of the terminal 200. In order to execute a function according to a human body communication signal, the controller 230 determines whether a communication key mode is set by a user. When the communication key mode is set, the controller 230 controls a human body communication checking unit 240 to detect a human body communication signal. Further, the controller 230 executes a function according to the detected human body communication signal.

The controller 230 may control the audio processing unit 270 to output an alarm for interpreting the detected human body communication signal. In the present example, the human body communication signal is interpreted as a key signal according to the length of the human body communication signal. When the human body communication signal is detected for a short time, the controller 230 controls the audio processing unit 270 to output a short sound such as 'a short beep'. If the human body communication signal is detected for a long time, the controller 230 controls the audio processing unit 270 to output a long sound such as 'a long beep'. Moreover, the controller 230 may output vibrations according to the interpreted the human body communication signal.

The human body communication signal checking unit 240 checks a key signal corresponding to the human body communication signal detected through the human body communication signal input unit 260. The key signal is a signal mapped to execute a function according to the human body communication signal. Referring to Table 1, when the human body communication signal is detected once for a short duration, the human body communication signal checking unit 240 recognizes that the human body communication signal is a key signal input to turn power for a device on or off. In the present example, the human body communication signal checking unit 240 is included in the controller 230. However, the present invention is not limited thereto, and the human body communication signal checking unit 240 may be included in the controller 230 or configured apart from the controller 230. The human body communication signal checking unit 240 is described herein below with reference to FIGS. 3 to 5.

The display unit 250 displays data related to overall states and operations of the terminal 200. The display unit 250 may display a function executed according to a signal determined by the human body communication signal checking unit 240 under the control of the controller 230.

The human body communication signal input unit 260 may detect a human body communication signal transmitting and receiving data through a user's body. The human body communication signal input unit 260 is located at a surface of the terminal 200 so that the user may easily touch the human body communication signal input unit 260. For example, the human body communication signal input unit 260 may be located at a key or a display unit 250 of the terminal 200. The human body communication signal input unit 260 may detect a user's touch similar to an operation method for detecting touch through a touch screen. More specifically, when the user touches a surface of the terminal 200 where the human body communication signal input unit 260 is located, a change of a magnetic field or capacitance due to the touch of the user's body occurs on the surface of the terminal 200. Accordingly, the human body communication signal input unit 260 may detect the user's touch through the changed magnetic field or capacitance.

The audio processing unit 270 outputs a voice signal from the controller 230 through a speaker or transfers a voice signal input from a microphone to the controller 230. The audio processing unit 270 may output an alarm according to a human body communication signal detected in a human body communication key mode.

Hereinafter, the human body communication signal checking unit 240 for checking a human body communication signal input from the human body communication signal input unit 260 is described with reference to FIGS. 3 to 6.

Figure 3:
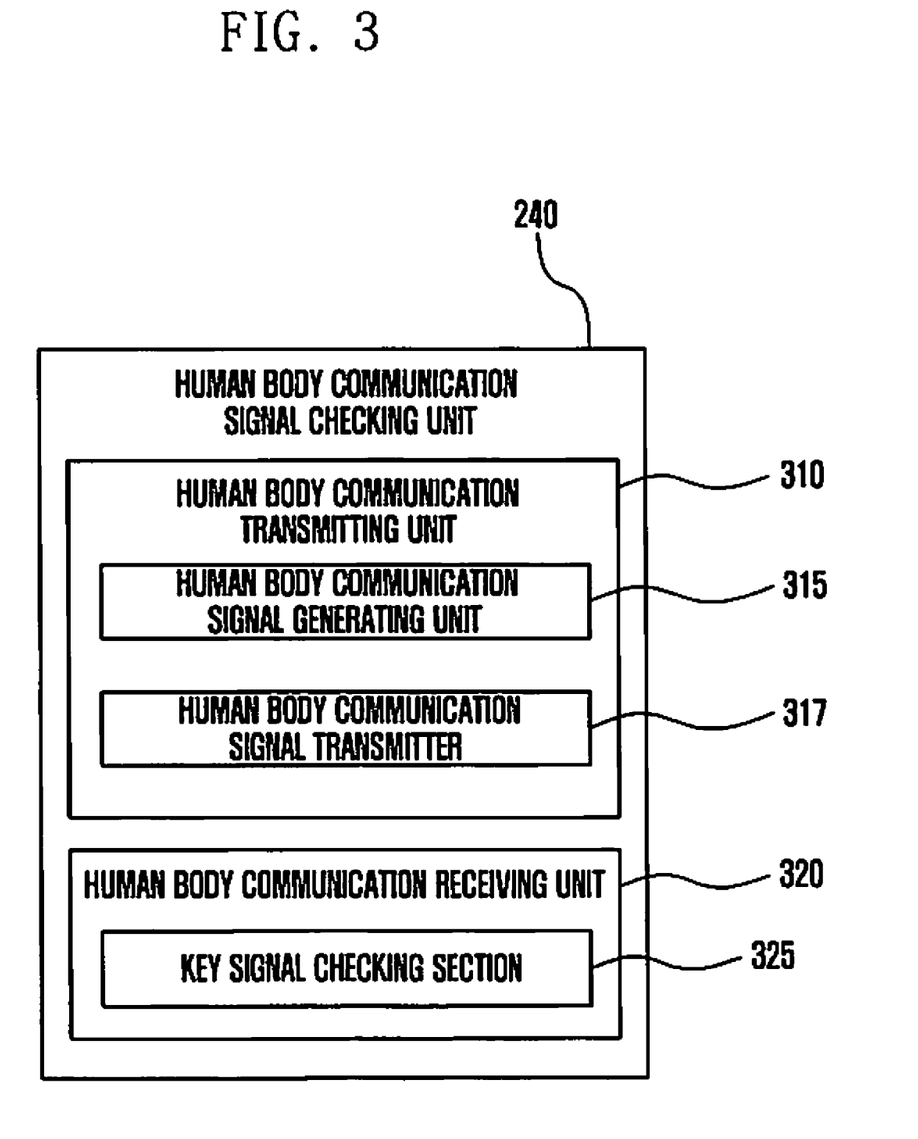
FIG. 3 is a block diagram illustrating a human body communication signal checking unit according to an embodiment of the present invention.

FIG. 3 is a block diagram illustrating a human body communication signal checking unit according to an embodiment of the present invention.

Referring to FIG. 3, the human body communication signal checking unit 240 includes a human body communication transmitting unit 310 and a human body communication receiving unit 320. In the present example, the human body communication transmitting unit 310 includes a human body communication signal generator 315 and a human body communication signal transmitter 317. The human body communication receiving unit 320 includes a key signal checking section 325.

When a user's touch is detected through the human body communication signal input unit 260, the human body communication signal generator 315 outputs a pulse signal for as long as the touch is maintained (i.e., a touch maintenance time). Accordingly, the human body communication signal transmitter 317 loads data to be transmitted to the human body communication receiving unit 320 onto the output pulse signal. The human body communication signal transmitter 317 transmits the pulse signal, onto which the data has been loaded, to the human body communication receiving unit 320. The data loaded onto the pulse signal may include data stored in the storage unit 200 such as music data, movie data, etc.

In a human body communication key mode, the human body communication signal transmitter 317 loads a pilot signal onto the pulse signal. The pilot signal is used for determining whether a human body communication signal is a short signal or a long signal (i.e., a signal having a short duration or a long duration, respectively). The pilot signal is a reference carrier wave for demodulation in the human body communication receiving unit 320 or a signal transmitted from the human body communication transmitting unit 310 for obtaining timing. A method for determining whether a human body signal is a short signal or a long signal according to the pilot signal loaded on the pulse is described herein below with reference to FIG. 6 below.

The human body communication transmitting unit 310 transmits a human body communication signal with a pilot signal to the human body communication receiving unit 320. The human body communication receiving unit 320 checks a key signal corresponding to the human body communication signal received through a key signal checking section 325. The key signal corresponding to the human body communication signal can be compared with data included in the table stored with respect to executable functions mapped according to human body signals and stored in the storage unit 220. In order to check the key signal corresponding to the human body communication signal, the human body communication receiving unit 320 may check the transmission number of the pulse according to a user's touch number detected in the human body communication signal input unit 260 as well as according to the number of pulse signals including the pilot signal. The human body communication receiving unit 320 may check a key signal for executing a specific function through a transmission number of the detected pulse signal and a number of pulse signals using a previously stored table.

A signal exchange arrangement between a human body transmitting unit 310 and a human body receiving unit 320 is described as follows with reference to FIG. 4.

Figure 4:
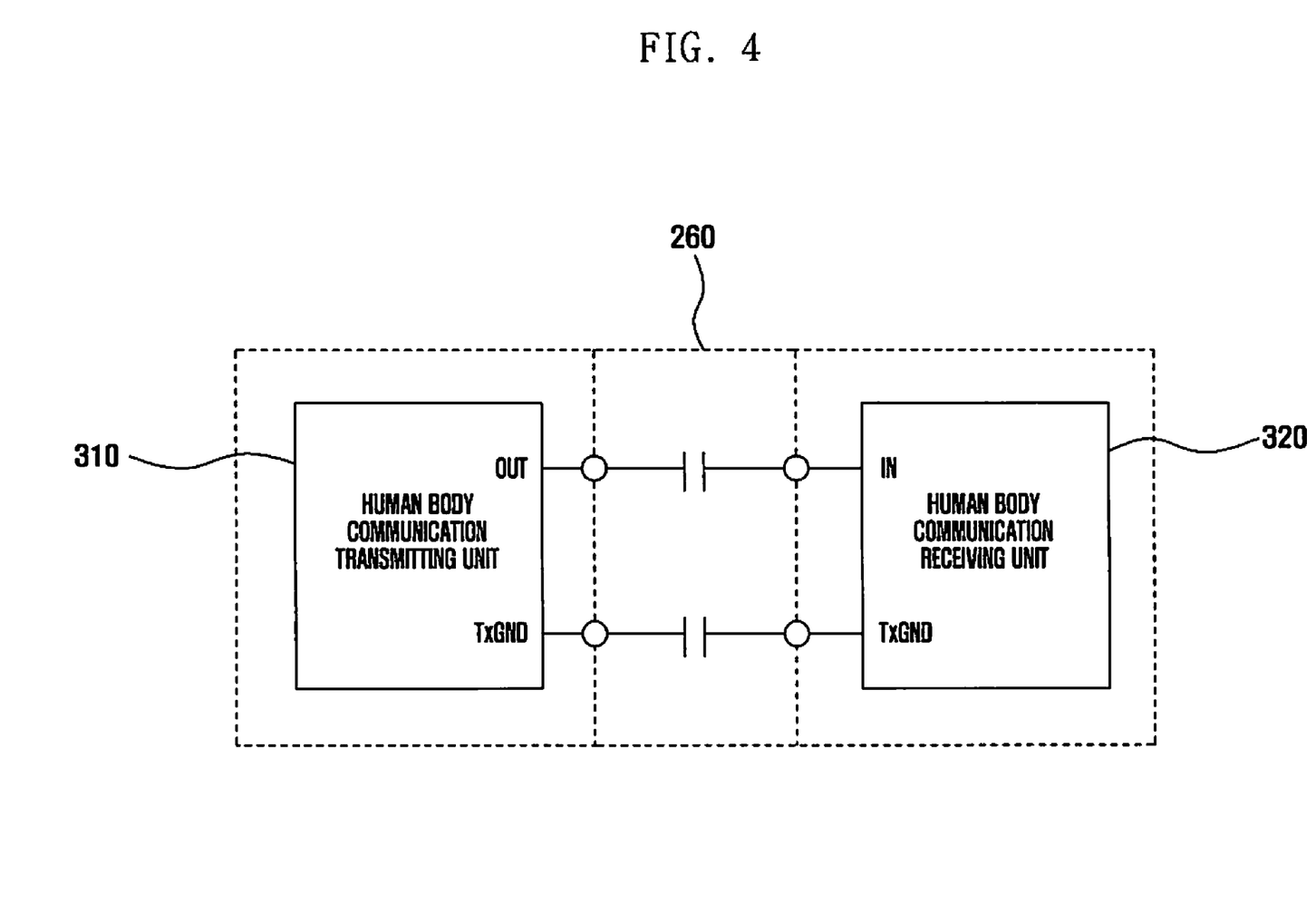
FIG. 4 is a block diagram illustrating a human body transmitting unit and a human body receiving unit according to an embodiment of the present invention.

FIG. 4 is a block diagram illustrating a human body transmitting unit and a human body receiving unit according to an embodiment of the present invention.

Referring to FIG. 4, the human body transmitting unit 310 and the human body receiving unit 320 are connected to each other through the human body communication signal input unit 260. When a user touches the human body communication signal input unit 260, an electric signal exchange path is formed between the human body transmitting unit 310 and the human body receiving unit 320.

A signal exchange flow between a human body transmitting unit 310 and a human body receiving unit 320 is explained with reference to FIG. 5.

Figure 5:
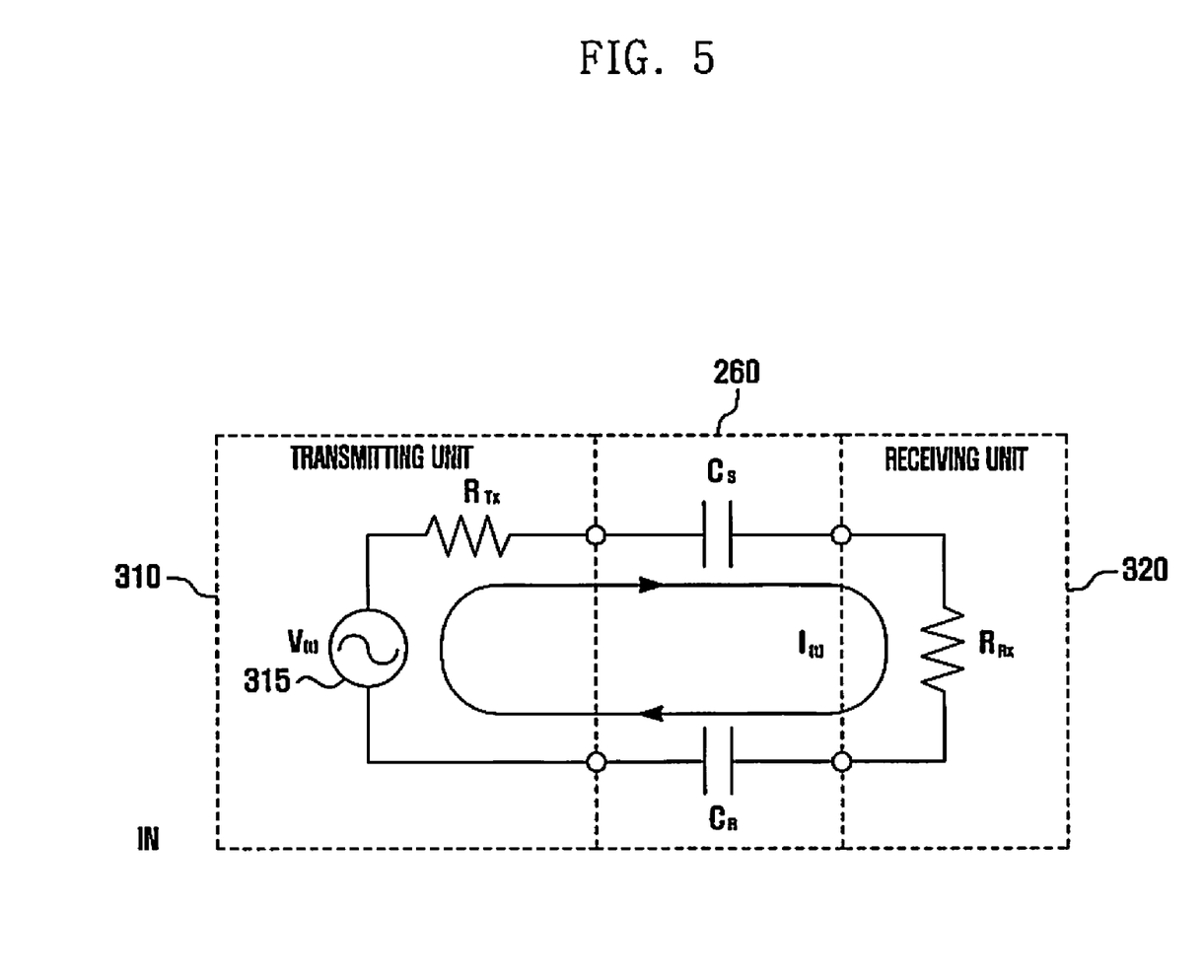
FIG. 5 is a diagram illustrating signal flow between a human body transmitting unit and a human body receiving unit according to an embodiment of the present invention.

FIG. 5 is a view illustrating signal flow between a human body transmitting unit and a human body receiving unit according to an embodiment of the present invention.

Referring to FIG. 5, the human body communication signal input unit 260 includes a transmitting capacitor $C_S$ and a receiving capacitor $C_R$. The human body transmitting unit 310 includes a transmission resistor $R_{TX}$ and a human body communication signal generator 315 $V(t)$ for generating a pulse signal. The human body receiving unit 320 includes a receiving resistor $R_{RX}$. When a user's touch is detected in the human body communication signal input unit 260, power $I(t)$ is applied between the human body transmitting unit 310 and the human body receiving unit 320. Accordingly, the body communication signal generator 315 of the human body transmitting unit 310 outputs a pulse signal according to the power $I(t)$. When a pilot signal is loaded onto the pulse signal from the body communication signal generator 315, the human body transmitting unit 310 transmits a human body communication signal including the pilot signal to the human body receiving unit 320. A determination of whether the human body communication signal is a short signal or a long signal is performed according to a number of pulse signals checked for a user's touch maintenance time detected in the human body communication signal input unit 260. A determination of whether the human body communication signal is a short signal or a long signal is performed according to a number of times a user's touch is detected in the human body communication signal input unit 260.

Figure 6:
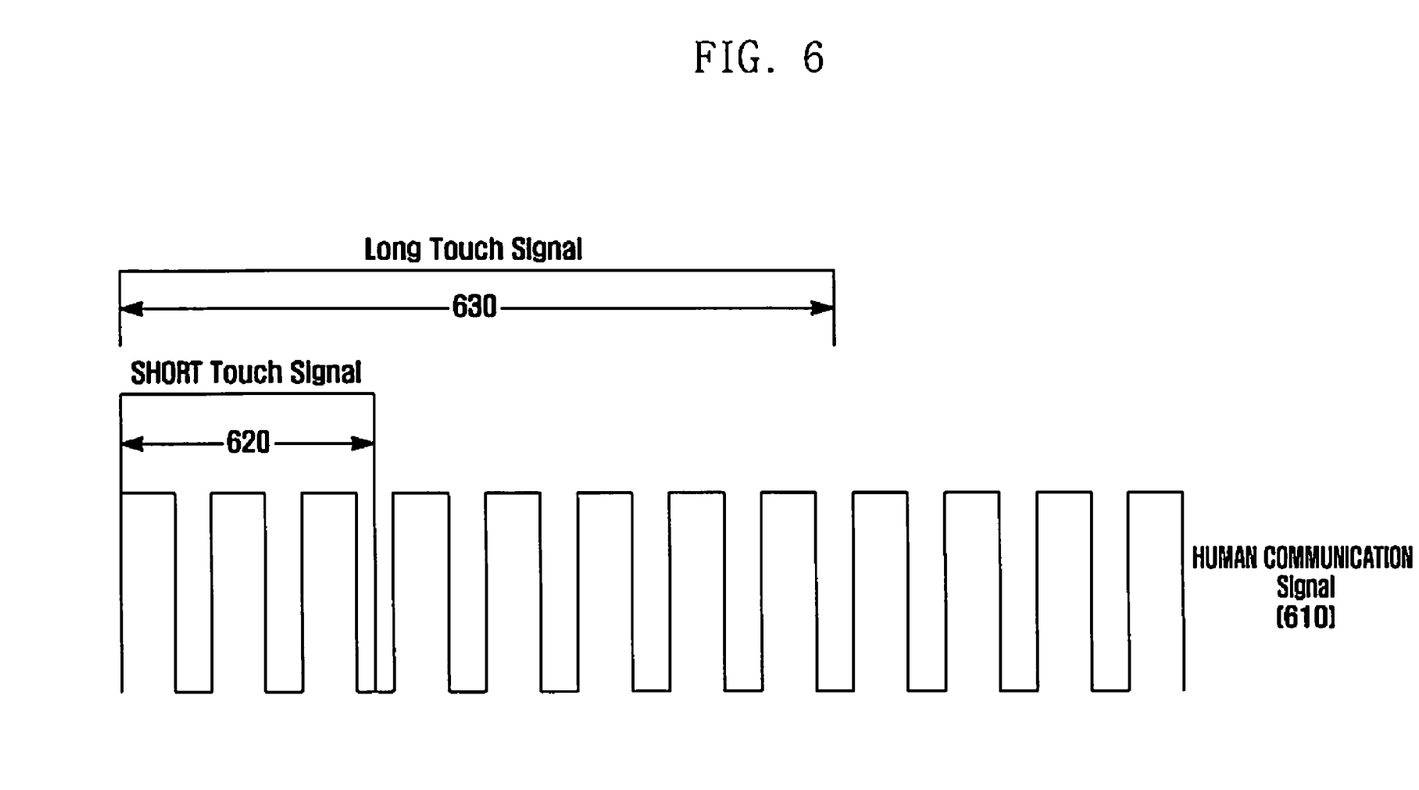
FIG. 6 is a diagram illustrating a human body communication signal according to an embodiment of the present invention.

A method determining whether the human body communication signal is a short signal or a long signal is described as follows with reference to FIG. 6. FIG. 6 is a diagram illustrating a human body communication signal according to an embodiment of the present invention.

Referring to FIG. 6, when a user's touch is detected by the human body communication signal input unit 260, the body communication signal generator 315 outputs a pulse signal 610 having a given interval and size. In this example, even though a pilot signal is included in the pulse signal, an overall shape of the pulse signal is maintained. Accordingly, the human body receiving unit 320 may check the number of pulse signals on which the pilot signal is loaded, and determine the length of the human body communication signal according to the number of the pulse signals. For example, as shown in FIG. 6, 3 pulse signals 620 can be recognized as a short human body communication signal, and 8 pulse signals 630 can be recognized as a long human body communication signal. The threshold number the pulse signals for discerning between short and long human body communication signals can change according to a user's selection or can be set by a manufacturing company of the terminal 200.

A method for executing a function using a human body communication signal is described as follows with reference to FIG. 7.

Figure 7:
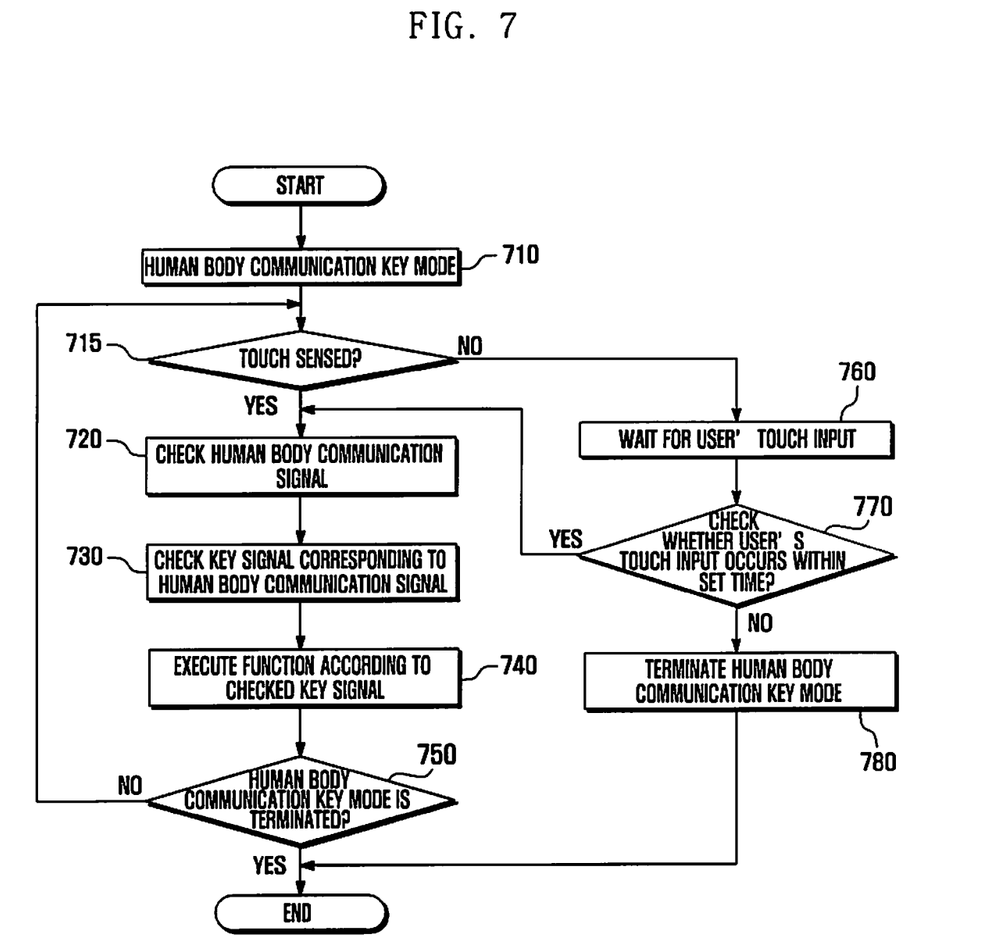
FIG. 7 is a diagram illustrating a method for executing a function according to an embodiment of the present invention.

FIG. 7 is a diagram illustrating a method for executing a function according to an embodiment of the present invention.

Referring to FIG. 7, when a user selects a human body communication key mode, a controller 230 sets a human body communication key mode in step 710. The controller 230 determines whether a user's touch is detected through a human body communication signal input unit 260 in step 715.

When the user's touch is detected, the controller 320 checks a human body communication signal according to the user's touch detected in step 720. The human body communication signal can be checked according to a number of user touches detected in the human body communication signal input unit 260 and the number of pulse signals generated for a touch maintenance time, i.e., the controller 230 can determine whether the human body communication signal is a long human body communication signal or a short human body communication signal according to the number of the pulse signals. The threshold number of the pulse signals for determining whether the human body communication signal is long or short can be set in advance, such as at the time of the terminal is manufactured, or set by the user. A pilot signal included in the pulse signal, is used to determine the length of the human body communication signal. For example, when the user touches the human body communication signal input unit 260 twice, one touch may transmit 3 pulse signals, and pulse signals less than 8 pulses long may set to as short human body communication signals. Accordingly, the controller 230 may determine that a series 6 of pulse signals are received through the human body communication signal checking unit 240 and determine the series of 6 pulse signals as a short human body communication signal.

Next, the controller 730 checks a key signal corresponding to a human body communication signal in step 730. The controller 230 executes a function according to the key signal checked in step 740. For example, when a human body communication signal with 3 pulse signals is detected three times as the human body communication signal, the controller 230 compares the detected signal with a table stored in the storage unit 220, such as in Table 1 above, and determines, as a result of the comparison, that the detected signal is a key signal for searching a message. Accordingly, the controller 230 displays the stored message on a display unit 250.

Subsequently, the controller 230 determines whether the human body communication key mode has been terminated in step 750. When the human body communication key mode has not been terminated, the controller 230 returns to step 715.

When the user's touch is not detected in step 715, the controller 230 waits for the user's touch input in step 760. Then, the controller 230 checks whether the user's touch input occurs within a set time in step 770. The set time can be determined, for example, according to a user's selection, or the time may be set when the terminal is manufactured. The set time is preferably about 1 minute. If the user's touch input occurs within the set time, the controller 230 returns to step 720. Conversely, if the user's touch input does not occur within the set time, the controller 230 terminates the human body communication key mode in step 780.

According to embodiments of the present invention, a terminal can execute various functions such as a menu section as well as a data transmission function according to a signal recognized using human body communication. Use of the present invention may broaden applications and utilization of human body communications that are conventionally limited to functions of transmitting and receiving data. Moreover, a user can conveniently select functions executed in the terminal using the human body communication.

Although embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims.

What is claimed is:

1. A method for executing a function of a terminal according to data transmitted and received through a human body, the method comprising:

detecting a touch in a human body communication signal input unit, wherein the human body communication signal input unit is in a human body communication key mode;

determining a number detected touches and determining a number pulse signals transmitted during a time in which the touch is maintained when the touch is detected; and executing a function corresponding to the human body communication signal.

2. The method of claim 1, wherein executing the function corresponding to the human body communication signal includes comparing characteristics of the human body communication signal with signal characteristics mapped to a previously stored function.

3. The method of claim 1, wherein the pulse signal includes a pilot signal.

4. A terminal for executing a function, comprising:

a human body communication signal input unit for detecting a touch corresponding to a human body communication signal;

a human body communication signal checking unit for determining a number of detected touches and a number of times pulse signals are transmitted during a time in which the touch is maintained, when the touch is detected; and a controller for executing a function corresponding to the checked human body communication signal.

5. The terminal of claim 4, wherein the human body communication signal checking unit comprises:

a human body communication signal generator for generating a pulse signal according to the time in which the touch is maintained;

a human body communication transmitting unit for transmitting the human body communication signal including the pulse signal and a pilot signal indicating a length of the human body communication signal; and a human body communication receiving unit for determining the function corresponding to the human body communication signal.

* * * * *